United States Patent
Turunc

(10) Patent No.: US 9,714,398 B2
(45) Date of Patent: Jul. 25, 2017

(54) METHOD FOR IMPROVING CORN OIL EXTRACTION USING ALKYL POLYGLYCOSIDES

(71) Applicant: General Electric Company, Schenectady, NY (US)

(72) Inventor: Umit Turunc, Trevose, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/139,451

(22) Filed: Apr. 27, 2016

(65) Prior Publication Data
US 2017/0029742 A1  Feb. 2, 2017

Related U.S. Application Data

(60) Provisional application No. 62/199,288, filed on Jul. 31, 2015.

(51) Int. Cl.
*C11B 13/00* (2006.01)
*C11B 1/10* (2006.01)

(52) U.S. Cl.
CPC ............ *C11B 13/00* (2013.01); *C11B 1/10* (2013.01)

(58) Field of Classification Search
None
See application file for complete search history.

(56) References Cited

U.S. PATENT DOCUMENTS

| | | | |
|---|---|---|---|
| 4,744,904 A * | 5/1988 | McAninch | B01D 17/00 210/632 |
| 6,228,400 B1 | 5/2001 | Lee et al. | |
| 6,488,946 B1 | 12/2002 | Milius et al. | |
| 8,192,627 B2 | 6/2012 | Gallop et al. | |
| 8,283,484 B2 | 10/2012 | Cantrell et al. | |
| 2012/0245370 A1 | 9/2012 | Sheppard et al. | |
| 2016/0115425 A1 * | 4/2016 | Blankenburg | B01D 17/047 554/20 |

FOREIGN PATENT DOCUMENTS

| | | |
|---|---|---|
| CA | 2789917 A1 | 3/2013 |
| CN | 102965942 A | 3/2013 |
| WO | WO 2013/135643 A1 | 9/2013 |
| WO | WO 2015057191 A1 | 4/2015 |

OTHER PUBLICATIONS

Savic, S., et al., Behind the alkyl polyglucoside-based structures: lamellar liquid crystalline and lamellar gel phases in different emulsion systems, 2014, Alkyl Polyglucosides, From natural-origin surfactants to propsective delivery systems, Chapter 2, pp. 21-52 and 2 cover pages.*
The Dow Chemical Company, Triton B and CG alkyl polyglucoside surfactants, Product Safety Assessment, 2010, Dow, 6 pages.*
Bergfeld, W. F., et al., Decyl Glucoside and other alkyl glucosides as used in cosmetics, 2011, Final Safety Assessment, Cosmetic Ingredient Review, 31 pages.*
Balzer, D. and Luders, H., "Nonionic Surfactants Alkyl Polyglucosides", pp. 2-14, 2000.
Wang, H. et al., "Effect of Low-Shear Extrusion on Corn Fermentation and Oil Partition", Food Science and Human Nutrition Publications and Papers, Iowa State University, Journal of Agriculture Food Chemistry, 57, 2302-2307, 2009.
Cosmetic Ingredient Review, Final Safety Assessment, "Decyl Glucoside and Other Alkyl Glucosides as Used in Cosmetics", 31 pages, Dec. 19, 2011.
International Search Report and Written Opinion mailed Apr. 8, 2014 for PCT/US2013/064956 filed Oct. 15, 2013.
International Preliminary Report on Patentability issued Apr. 19, 2016 for PCT/US2013/064956 filed Oct. 15, 2013.
Database WPI, Week 201401, Apr. 1, 2014, Thomson Scientific, London, GB, AN 2013-K00861, XP002722596 & CN 102 965 942 A (Wuijang Hongqiangwei Textile Co., Ltd.) Mar. 13, 2013, Abstract.
Eckard, A.D. et al., "Enzyme Recycling in a Simultaneous and Separate Saccharification and Fermentation of Corn Stover: A Comparison Between the Effect of Polymeric Micelles of Surfactants and Polypeptides", Biosource Technology, 132, pp. 202-209, 2013.
Office Action mailed Nov. 9, 2016 in U.S. Appl. No. 15/029,813, filed Apr. 15, 2016.

* cited by examiner

*Primary Examiner* — Yate K Cutliff
(74) *Attorney, Agent, or Firm* — Wegman, Hessler & Vanderburg

(57) ABSTRACT

Methods are provided for recovering oil from a process stream mixture in a corn to ethanol process. The method comprises adding an oil separation aid to the process stream wherein the oil separation aid is an alkyl polyglycoside (APG).

23 Claims, No Drawings

METHOD FOR IMPROVING CORN OIL EXTRACTION USING ALKYL POLYGLYCOSIDES

CROSS-REFERENCE TO RELATED APPLICATION

This application claims the priority benefit of U.S. Provisional Patent Application Ser. No. 62/199,288 filed Jul. 31, 2015.

FIELD OF INVENTION

The invention pertains to methods for improving the separation of oil from oil containing mixtures and emulsions. More particularly, the invention pertains to methods for improving the yield of corn oil in corn to ethanol processing systems.

BACKGROUND OF THE INVENTION

Over the past few decades, ethanol has become increasingly important as an alternative fuel. One advantage to use of ethanol fuel is that it can be produced from corn. Ethanol from corn is produced by either the wet-milling or dry-milling process. During the milling process, the corn kernels are ground, and the main constituents (starch, gluten, germ, and fiber) are separated and the starch is further processed to make ethanol. In dry corn milling the corn kernels are ground, and without additional separation, mixed with water and the mixture is further processed to make ethanol. The residue of the ethanol process is referred to as stillage. Stillage from dry corn milling contains a mixture of solids, oil, and water. A portion of the stillage is processed to extract the corn oil incorporated therein.

In the dry milling operation, a "beer" mash is made as a result of the fermentation process. The ethanol is removed from the "beer" in a stripper or distillation column. The remaining mash is referred to as whole stillage. This whole stillage is then subjected to centrifuging or other separation techniques to result in a thin stillage and a wet cake. This thin stillage is further processed in an evaporator or the like to remove excess water and produce a concentrated thin stillage stream called "syrup". Typically, this syrup has a moisture content of between about 15-90 wt %. Increasingly, the syrup is treated via heat and centrifuge or other separation techniques to separate corn oil for industrial usage of the corn oil such as in biodiesel fuel.

SUMMARY OF THE INVENTION

In one aspect of the invention, a method is provided for recovering oil in a corn to ethanol process wherein oil and solids are present in a process stream mixture. The method comprises adding to the process stream mixture an oil separation aid comprising an alkyl polyglycoside (APG) or mixtures of APGs. The process stream mixture may, in certain aspects of the invention, be present in a whole stillage process stream, a thin stillage process stream, an evaporator, in a syrup stream, or in feed or makeup water to a corn to ethanol fermentation process.

In other aspects of the invention, the APG has the formula

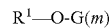

wherein $R^1$ is a hydrocarbyl radical having from about 1 to about 22 C atoms, G is a glucose unit, and m is from about 1 to about 8. In other exemplary embodiments, $R^1$ is chosen from the group consisting of $C_1$-$C_{22}$ alkyl groups, $C_2$-$C_{22}$ alkenyl groups and $C_2$-$C_{22}$ alkynyl groups wherein said groups may be substituted or non-substituted and are straight or branched or contain aryl groups; m may be from about 1 to about 8.

In other embodiments of the invention, the APG is a member or members selected from the group consisting of caprylyl glucoside, decyl glucoside, undecyl glucoside, lauryl glucoside, myristyl glucoside, hexadecyl d-glucoside, octadecyl d-glucoside, arachidyl glucoside, caprylyl/capryl glucoside, $C_{8-16}$ alkyl glucoside, $C_{10-16}$ alkyl glucoside, $C_{12-16}$ alkyl glucoside, $C_{12-20}$ alkyl glucoside, cetaryl glucoside, $C_{20-22}$ alkyl glucoside, coco glucoside, isostearyl glucoside, octyldodecyl glucoside.

In other exemplary embodiments from about 1 to about 5,000 ppm of the APG oil separation aid are added to the process stream based upon one million parts of the process stream mixture. In other embodiments, from about 100 to about 2500 ppm of the oil separation aid is added with other embodiments comprising adding about 250 to about 1250 ppm of the oil separation aid to the process stream mixture.

DETAILED DESCRIPTION

In one aspect of the invention, an alkyl polyglycoside (APG) treatment agent is applied to a process stream mixture that is present in a corn to oil process. By process stream mixture, we mean that the APG is brought into contact with any oil/solids/water mixture present in such corn to oil processes or into contact with any solids or liquid that will ultimately be brought in contact with such oil/solids/water mixture. The phrase "process stream mixture" includes whole stillage process streams, thin stillage process streams, evaporator streams, syrup streams, and the feed or make up to a corn to ethanol fermentation process such as fermentation feed addition to a beer well or the like.

In one embodiment, from about 1-5000 ppm of the APG or combination of APGs is fed to the process stream based upon the weight of the process stream mixture to function as an oil separation aid. In another exemplary aspect, the feed rate is between about 100-2500 ppm of the APG with an even more exemplary addition range being from about 250-1250 ppm. The present disclosure envisions and covers any sub-range or ranges within 1-5000 ppm, and especially any sub-range or ranges within 250-1250 ppm.

The APGs may be defined by the following Formula I.

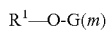

wherein $R^1$ is a hydrocarbyl radical from about 1 to about 22 C atoms. This hydrocarbyl radical may be chosen from $C_1$-$C_{22}$ alkyl groups, $C_2$-$C_{22}$ alkenyl groups, and $C_2$-$C_{22}$ alkynyl groups. The hydrocarbon chains of such groups can be straight, branched, or contain aryl groups. The chains may be substituted or non-substituted. G in the above formula represents a glucose unit and m represents the number of glucose units.

The APGs are commonly produced via reaction of glucose molecules with fatty alcohols in the presence of an acid catalyst. Typically, the APGs are a mixture of alkyl monoglycoside (fatty alcohol with one glucose unit) and alkyl oligoglycosides (fatty alcohols with various numbers of glucose units).

The number of glucose molecules, m, in Formula I is sometimes referred to as DP (degree of polymerization). The DP expresses the average distribution of the alkyl mono and oligo-glycosides on a weighted average basis. Accordingly, m in Formula I may be within the range of about 1 to about 8 with a range of about 1 to 3 also being noteworthy.

Some exemplary APGs are as follows:

| Common name | Description | CAS # |
|---|---|---|
| Caprylyl glucoside | Condensation reaction product of caprylic ($C_8$) alcohol with glucose | 29836-26-8 |
| Decyl glucoside | Condensation reaction product of decyl ($C_{10}$) alcohol with glucose | 58846-77-8; 68515-73-1; 141464-42-8 |
| Undecyl glucoside | Condensation reaction product of undecyl ($C_{11}$) alcohol with glucose | 98283-67-1 |
| Lauryl glucoside | Condensation reaction product of lauryl ($C_{12}$) alcohol with glucose | 27836-64-2; 110615-47-9 |
| Myristyl glucoside | Condensation reaction product of myristyl ($C_{14}$) alcohol with glucose | 54549-26-7 |
| Hexadecyl d-glucoside | Condensation reaction product of hexadecyl ($C_{16}$) alcohol with glucose | |
| Octadecyl d-glucoside | Condensation reaction product of octadecyl ($C_{18}$) alcohol with glucose | |
| Arachidyl glucoside | Condensation reaction product of arachidyl ($C_{20}$) alcohol with glucose | 144982-05-8 |
| Caprylyl/capryl glucoside | Condensation reaction product of a mixture of caprylic ($C_8$) & decyl ($C_{10}$) alcohols with glucose | 68515-73-1 |
| $C_{8-16}$ alkyl glucoside | Condensation reaction product of a mixture of ($C_8$-$C_{16}$) alcohols with glucose | |
| $C_{10-16}$ alkyl glucoside | Condensation reaction product of a mixture of ($C_{10}$-$C_{16}$) alcohols with glucose | 110615-47-9 |
| $C_{12-16}$ alkyl glucoside | Condensation reaction product of a mixture of ($C_{12}$-$C_{16}$) alcohols with glucose | |
| $C_{12-20}$ alkyl glucoside | Condensation reaction product of a mixture of ($C_{12}$-$C_{20}$) alcohols with glucose | |
| Cetaryl glucoside | Condensation reaction product of cetaryl ($C_{16-18}$) alcohol with glucose | |
| $C_{20-22}$ alkyl glucoside | Condensation reaction product of a mixture of ($C_{20-22}$) alcohols with glucose | |
| Coco glucoside | Condensation reaction product of coconut alcohol with glucose | |
| Isostearyl glucoside | Condensation reaction product of isostearyl alcohol with glucose | 200143-69-0 |
| Octyldodecyl glucoside | Condensation reaction product of octyldodecyl alcohol with glucose | |

The APGs are commercially available.

After the APG or mixed APGs are added to the process stream mixture, oil can be separated therefrom via conventional separation techniques such as centrifuging, decanting, or solvent extraction.

Although this invention has been described and disclosed in relation to certain preferred embodiments, obvious equivalent modifications and alterations thereof will become apparent to ordinary skill in the art upon reading the specification and appended claims. Accordingly, the presently disclosed invention is intended to cover all such modifications and alterations and is limited only by the scope of the claims that follow:

The invention claimed is:

1. A method for recovering oil in a corn to ethanol process wherein oil and solids are present in a process stream mixture, said method comprising adding to said process stream mixture an oil separation aid, said oil separation aid comprising a glucoside or mixture of glucosides chosen from the group consisting of caprylyl glucoside, decyl glucoside, undecyl glucoside, lauryl glucoside, myristyl glucoside, hexadecyl d-glucoside, octadecyl d-glucoside, arachidyl glucoside, caprylyl/capryl glucoside, $C_{8-16}$ alkyl glucoside, $C_{10-16}$ alkyl glucoside, $C_{12-16}$ alkyl glucoside, $C_{12-20}$ alkyl glucoside, cetaryl glucoside, $C_{20-22}$ alkyl glucoside, coco glucoside, isostearyl glucoside, octyldodecyl glucoside.

2. A method as recited in claim 1 wherein said process stream mixture is present in a whole stillage process stream, a thin stillage process stream, in an evaporator, in a syrup stream, or in feed or make up water to a corn to ethanol fermentation process.

3. A method as recited in claim 1 wherein about 1 to about 5,000 ppm of said oil separation aid are added to said process stream based upon one million parts of said process stream mixture.

4. A method as recited in claim 3 wherein about 100 to about 2500 ppm of said oil separation aid are added.

5. A method as recited in claim 3 wherein about 250 to about 1250 ppm of said oil separation aid are added.

6. A method as recited in claim 1 wherein said glucoside is caprylyl glucoside.

7. A method as recited in claim 1 wherein said glucoside is decyl glucoside.

8. A method as recited in claim 1 wherein said glucoside is undecyl glucoside.

9. A method as recited in claim 1 wherein said glucoside is lauryl glucoside.

10. A method as recited in claim 1 wherein said glucoside is myristyl glucoside.

11. A method as recited in claim 1 wherein said glucoside is hexadecyl d-glucoside.

12. A method as recited in claim 1 wherein said glucoside is octadecyl d-glucoside.

13. A method as recited in claim 1 wherein said glucoside is arachidyl glucoside.

14. A method as recited in claim 1 wherein said glucoside is caprylyl/caryl glucoside.

15. A method as recited in claim 1 wherein said glucoside is $C_{8-16}$ alkyl glucoside.

16. A method as recited in claim 1 wherein said glucoside is $C_{10-16}$ alkyl glucoside.

17. A method as recited in claim 1 wherein said glucoside is $C_{12-16}$ alkyl glucoside.

18. A method as recited in claim 1 wherein said glucoside is $C_{12-20}$ glucoside.

19. A method as recited in claim 1 wherein said glucoside is cetaryl glucoside.

20. A method as recited in claim 1 wherein said glucoside is $C_{20-22}$ alkyl glucoside.

21. A method as recited in claim 1 wherein said glucoside is coco glucoside.

22. A method as recited in claim 1 wherein said glucoside is isostearyl glucoside.

23. A method as recited in claim 1 wherein said glucoside is octyldodecyl glucoside.

* * * * *